United States Patent
Pfeifer et al.

(10) Patent No.: US 7,285,234 B2
(45) Date of Patent: Oct. 23, 2007

(54) PROCESS AND DEVICE FOR PRODUCING SOLID BODIES BY SEQUENTIAL LAYER BUILDUP

(75) Inventors: Rolf Pfeifer, Boeblingen-Dagersheim (DE); Jialin Shen, Bernstadt (DE); Didier von Zeppelin, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 388 days.

(21) Appl. No.: 10/781,304

(22) Filed: Feb. 18, 2004

(65) Prior Publication Data

US 2004/0182510 A1    Sep. 23, 2004

(30) Foreign Application Priority Data

Feb. 18, 2003    (DE) ................. 103 06 886

(51) Int. Cl.
*B32B 37/00* (2006.01)
*B32B 38/04* (2006.01)
*D04H 1/16* (2006.01)
*B27J 5/00* (2006.01)

(52) U.S. Cl. .............. 264/113; 264/125; 264/483; 264/488; 264/497; 156/284; 156/272.8; 156/379.6

(58) Field of Classification Search ........... 156/284, 156/272.8, 379.6; 264/113, 125, 483, 488, 264/497

See application file for complete search history.

(56) References Cited

U.S. PATENT DOCUMENTS 5,904,889 A    5/1999 Serbin et al.
5,936,861 A *  8/1999 Jang et al. ............... 700/98
6,136,257 A    10/2000 Graf et al.

FOREIGN PATENT DOCUMENTS

| DE | 198 13 742 C1 | 3/1998 |
|---|---|---|
| DE | 101 29 305 A1 | 6/2001 |
| EP | 0 925 169 B1 | 12/2001 |

* cited by examiner

*Primary Examiner*—Rena Dye
*Assistant Examiner*—Lawrence Ferguson
(74) *Attorney, Agent, or Firm*—Akerman Senterfitt; Stephan A. Pendorf; Yonghong Chen

(57) ABSTRACT

Process for layer-wise production of a three dimensional body (generative rapid prototyping), in particular by 3D binder printer, including a multiple succession of the steps of depositing a powder particle layer, activating in defined areas an adhesive present on the powder particles and/or in the powder particle coating, as well as adhering the powder particles to each other and to the layer thereunder, wherein the powder particle layer is electrically discharged by ionized particles and brushed flat by means of an electrically insulated blade prior to activation of the adhesive material, and the invention further concerns a device adapted for application of thin powder particle layers, including at least one ionizing device.

20 Claims, 1 Drawing Sheet

PROCESS AND DEVICE FOR PRODUCING SOLID BODIES BY SEQUENTIAL LAYER BUILDUP

BACKGROUND OF THE INVENTION

1. Field of Invention

The invention concerns the production of three-dimensional bodies (3D-bodies) using layer build-up processes (powder based generative rapid prototyping processes), and in particular the production of suitable powder layers, as well as the production of 3D-bodies from these powder layers, wherein in particular layered powder material is employed.

3D binder printing is among the newer and particularly interesting powder based generative rapid prototyping processes.

2. Related Art of the Invention

In a first variation of 3D binder printing a layer of powder material or granulates is applied upon a substrate, after which predetermined areas, which respectively correspond to a layer of an object to be produced, are moistened with a liquid binder. The powder particles are cross-linked or adhered in the moistened areas by the liquid binder. Upon the subsequent evaporation of the solvent in the liquid binder, the powder particles adhere directly to each other, wherein they are coalesced with each other at least in their edge areas. 3D-binder printing processes, which are particularly directed to this type, are know for example from European Patents EP 0644 809 B1, EP 0686 067 B1 and European Patent Application EP 1 099 534 A2.

From EP 0 925 169 B1 a further variant of the 3D binder printing process is known, in which mixtures of powders, fillers and adhesives are employed. The binder liquid basically comprises essentially only a solvent for the adhesive contained in the mixture. In this embodiment, the adhesive can also be present in the form of a surface coating of the powder particles. Therein, it is known to use water soluble polymers as the powder particle surface coating, and aqueous binder liquids. Water soluble systems have however the disadvantage, that they tend to agglomerate or adhere upon exposure to ambient humidity.

DE 198 13 742 C1 discloses a process for production of three dimensional objects by sequential layer buildup involving hardening with electromagnetic radiation powder particles solidifiable by exposure to electromagnetic radiation. A device is proposed for reducing charge differences of the layer-forming powder particles in the dispensing device, in order to prevent the powder particles from plugging up the outlet aperture.

The known processes have the disadvantage, that the powder particles frequently agglomerate during dispensing from the dispensing device and during layering on the substrate. In general, there is found on the layer, besides the primary powder particles, also more or less large agglomerates, which lead to uneven powder layers and defects in the bodies formed therefrom. Agglomerates in particular interfere when using a smoothing device for the applied powder layer.

For the production of homogenous bodies with consistent quality the powder must be agglomerate-free, essentially from the time of leaving the dispensing device. Also, the electrostatic charging of the powder particles by rubbing against each other while leaving the dispensing device must be avoided.

SUMMARY OF THE INVENTION

It is thus the task of the invention to provide a process for production of powder layers which are substantially agglomerate-free, and also as thin and homogenous as possible, for the production of a 3D body by sequential deposition of powder layers and their selective solidification, as well as to provide a suitable device with which to achieve these powder layers.

This task is solved by a process according to Claim 1, a device according to Claim 12, as well as a material according to Claim 18.

Preferred further refinements of the invention are set forth in the dependent claims.

A preferred embodiment of an inventive device for production of powder layers, referred to in the following as "recoating system", will be described in greater detail on the basis of FIG. 1.

BRIEF DESCRIPTION OF THE DRAWINGS

Therein there is shown.

DETAILED DESCRIPTION OF THE INVENTION

Figure 1:
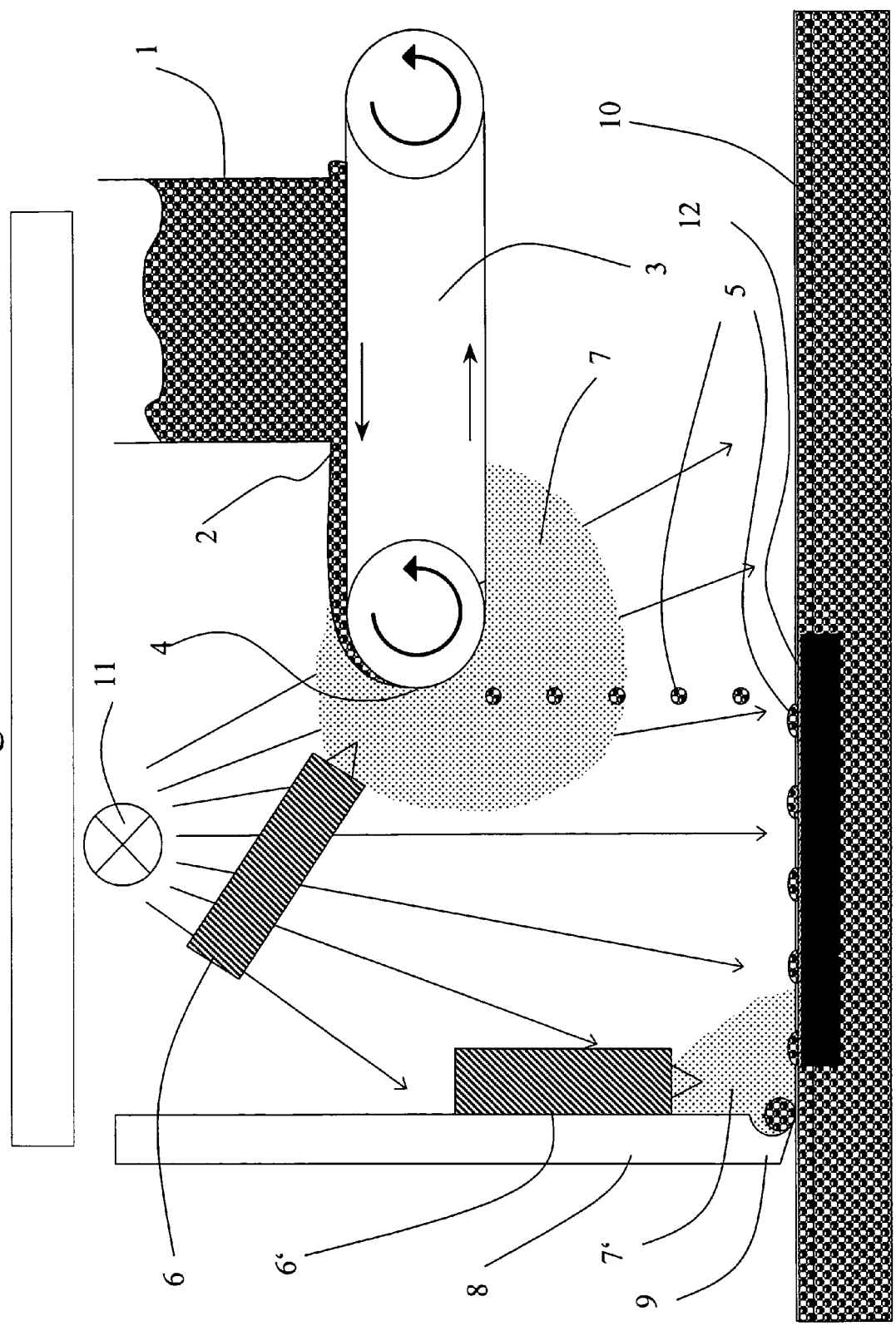
FIG. 1—a conceptual drawing of powder application with a 3D binder print device in side view, including a powder supply container 1, a dispensing gap 2, a powder conveyor unit 3, a conveyor edge 4, individual powder particles 5, ionizing device 6, 6', charge field (cloud)(electric field) 7, 7', an electrically insulated blade 8, a blade edge 9, the powder layer to be smoothed or flattened 10, a heat emitter 11 and adhered powder powder particles 12.

As the first element of the recoating system, a dispensing device is provided, which includes as components the powder supply container 1, dispensing aperture 2, powder conveyor unit 3 and conveyor edge 4. The powder material is stored in the powder container and dispensed onto the conveyor unit 3. Therein the dispensing preferably occurs by means of a dispensing aperture 2 which is formed by the gap between the surfaces of the powder container and the powder conveyor unit. The conveyor unit has a total breadth of the powder layer to be formed. The gap can in certain cases be lengthened in the direction of conveyance by a bordering surface or a cover plate. The powder is conveyed by the conveyor belt. The powder leaves the conveyor at the conveyor edge 4. Thereupon the powder particles 5 can fall unimpeded onto the substrate or, as the case may be, the already formed powder bed. In the illustration the powder particles 5 are shown as agglomerates of small primary powder particles. In the vicinity of the conveyor edge an ionizing device 6 is provided, which produces charged particles, or which generates flow of ionized gas. Thereby the powder particles 5 are exposed to charged particles, which leads to the reduction in their charge differential. Preferably an ion cloud of charged particles 7 is formed, through which the powder particles 5 fall. Thereby the charge differences of the powder particles are reduced and the powder particles are disagglomerated.

The thus formed primary powder particles fall upon the substrate or the powder bed, which forms the second element of the recoating system. Here they form the contiguous new powder layer 10. This powder layer is brushed flat with an electrically insulated blade 8. The blade extends over the entire breadth of the powder layer. Any new charging of the powder particles due to rubbing will be prevented by a further ionizing device 6'. Therein the blade preferably pushes an ion cloud 7' ahead of it.

The blade edge 9 is preferably so designed, that the blade pushes the powder in a rolling movement ahead of it. This is preferably accomplished by a suitable blade angle (angle of attack) and a rounding of the blade edge 9 commensurate with the powder particle size.

Following the brushing flat of the layer, adhesion and hardening of defined areas of the powder layer 12 is carried out, wherein the adhesion of the powder particles within this new layer as well as of these powder particles with the substrate is accomplished. This is accomplished by moistening with a binder liquid, which activates the adhesive present in the layer. The drying of the moistened areas is facilitated by a heat emitter 11.

The dosing gap 2 has a breadth in the range of 100 μm to several mm. Typically the breadth of the gap is a multiple of the thickness of the subsequently to be produced powder layer. The amount being conveyed can be adjusted precisely by means of the conveyor device 3, in particular by its length. The conveyance of the powder can be supported for example by vibrator units in the conveyor unit. Preferably only the needed amount is dispensed via the conveyor unit, without excess material.

As can be seen from FIG. 1, the powder particles leave the conveyor edge 4 essentially in freefall. Since the powder particles hardly impede each other during falling, this results in a very high contact surface exposed to the charged particles and a very efficient reduction in charge difference of the powder particles. Since the powder particles do not contact each other during the fall onto the substrate, a renewed electrostatic charging is also prevented.

The ionizing device 6 can be comprised of multiple discharge electrodes, which are provided directly ahead of and/or behind the conveyor edge 4. The electrodes serve for producing a strong electrical field for ionizing the surrounding atmosphere. The work potential of the electrodes is typically in the range of from −10 to +10 kV.

In a particularly preferred embodiment of the invention the ionizing device comprises a feed line for ionized gas. Therein it is advantageous to supply the gas stream simultaneously with the falling powder particles 5.

The newly formed powder layer formed with the inventive dispensing device typically exhibits a thickness of multiple average powder particle diameters. Preferably the median is approximately 50 μm to several mm. In general no layer of even thickness is formed.

Accordingly, in accordance with the invention, a flattening or smoothing device is provided for producing even layers. The flattening device could comprise a cylindrical roller or scraper (doctor blade).

Preferably a blade is employed, which is guided over the layer at the desired spacing for the layer thickness. The material is brushed flat and leveled. Excess powder material is pushed ahead of the blade.

After bushing flat and leveling, the average layer thickness is preferably approximately 20 to 250 μm.

In accordance with the invention an ionizing device 6' is provided in immediate proximity to the powder layer ahead of the blade. This can likewise be a discharge electrode or one or more feed pipes for ionized gas.

The blade, in particular the edge of the blade in contact with the powder, is electrically insulated. Thereby the effect of the electrical field or ion cloud 7' formed by the ionizing device is enhanced.

The edge of the blade can be comprised of carbide or steel. Preferably the blade, or at least the edge thereof, is formed of an electrically non-conductor, particularly preferably an oxide-, carbide- or nitride-ceramic, such as for example $Al_2O_3$, $ZrO_2$, $SiC$ or $Si_3N_4$.

In view of the very loose and essentially agglomerate-free layer it is however also possible to make the blade of a comparatively soft material, such as plastic. In this case, the blade is particularly preferably PTFE (polytetrafluroethylene).

A further aspect of the invention is concerned with the powder material or, as the case may be, the powder particles thereof.

Metals suitable for the powder material include in particular the metals, composites, alloys and inter-metallic phases of elements of groups Al, Ti, Nb, Cr, Fe, Co, Ni, W, Mo, Zn, Cu, Ag, Au, Sn, Pt and/or Ir.

Ceramics suitable as the powder material include in particular the oxides, carbides and/or nitrides of at least one element of groups B, Al, Si, Al, Ti, Zr, Mg and/or Ca.

Plastics suitable as the powder material include in particular polyester, polyolefine, polyurethane, polyether-etherketone, polyamide, polyimide and poly(meth)acrylate.

In a preferred embodiment of the invention powder particles coated with adhesive are employed. The adhesives are activatable and hardenable in particular by binder liquids, by exposure to light or by laser radiation.

In accordance with the invention, hydrophobic coatings of the powder particle surfaces are preferred. Thereby it becomes possible to form powder particle layers of a few powder particle layers in thickness, even under exposure to atmospheric humidity, and depending upon the starting powder, even a single powder particle monolayer. Therewith, with the inventive process and hydrophobic coated powder particles, minimal layer thicknesses of the applied powder layer of less than 40 μm, depending upon starting powder particles even under 15 μm, are possible.

The thickness of the coating is therein preferably in the range of 0.1 to 10% of the average diameter of the powder material. Typically, the thickness of the adhesive material containing layer is 50 nm to 5 μm. The preferred amount of the adhesive is in the range of 0.2 to 10 wt. % of the respective coated powder material.

The coating can in certain cases, beside adhesive, also include fine grain material of plastic, metal or ceramic.

As the adhesives suited for activation by a binder liquid, particularly preferred are organic or organo-metallic polymers with low water solubility, however, good solubility in organic solvents, in particular poly(meth)acrylate, polyester, polyolefins, polyvinyls, polystyrols, polyvinyl alcohols, polyurethanes, waxes or phenol resins. Particularly preferred adhesives are polyvinylpyrrolidones or polyvinylbutyrates.

In a preferred embodiment of the generative RP process, there is selected the 3D binder printing with a polymer coated powder material and a liquid binder based on an organic solvent. The activation of the adhesive occurs by dissolving or swelling of the coating and the cohesion occurs by evaporation of the binder liquid. Therein, the amount of the binder liquid is preferably so selected, that it is not sufficient for dissolving the totality of the adhesive bound in the coating. In particular also the binder phases of the respectively employed granulates are not dissolved. Rather, the amount of the binder liquid is so measured, that it is only sufficient for dissolving or partially dissolving at the contact points, in certain cases surfaces, of adjacent powder particles. The accumulation of the binder liquid at these contact zones is supported by capillary action. Preferably, the amount of the binder liquid used for wetting the powder is an amount in the range of from 5 to 70 volume % of the powder volume to be coated. Particularly preferred is an amount of binder liquid at 5 to 25 times the volume of the adhesive present in the coating.

It is however likewise also possible, that adhesive is at least partially supplementally supplied together with, i.e., in, the binder liquid.

Among the preferred solvents in the binder liquid, there may be mentioned C2- through C7 alcohols, in particular ethyl alcohol, (iso)propanol or n-butanol, C3- through C8-ketones, such as acetone or ethyl-methyl-ketone, cyclic ethers, such as tetrahydrofuran, or polyethers, such as methyoxyethanol, dimethoxy diethylene glycol or dimethyoxytritheylene glycol. In the case of the use of wax-like adhesives, low molecular weight aliphatic carbohydrates, in particular cyclic or linear C6 through C8 aliphatics, are preferred.

In a further embodiment of the 3D binder print process the adhesive is incorporated, at least in part, together with the powder material in the powder layer. Adhesive powder particles are therein preferably substantially smaller than the powder particles of the powder material.

Insofar as the powder particles are coated, the coating can in certain cases also include solid hard materials of plastic, ceramic or metal.

The adhesive can be provided in the powder particle layer in the form of individual adhesive powder particles, as a coating of the powder particles or may be in the binder liquid.

The invention has the advantage of an exceptionally good depth resolution. Thus, very fine or precise structured 3D bodies are obtainable, in which the majority of the body-forming adhered powder particle layers have a thickness of less than 100 μm. It is even possible to produce bodies of which the thickness of the powder particle layers corresponds essentially only to the average diameter of the individual powder particles.

An inventive preferred application of the 3D bodies obtained using ceramic powder material lies in the casting technology and modeling or die construction. Thus, for example, $SiO_2$-fine grain material bound $Al_2O_3$-, or $ZrSiO_4$-ceramics are suitable as molds or inserts for the precision casting of metals.

One inventive preferred embodiment of the bodies obtained by means of plastic-powder material lies in the production of mold cores for the building of casting molds. By sanding or mudding it becomes possible to produce from the plastic bodies, for example, casting hollow shapes or molds for metal casting.

The inventive porous metallic bodies are suitable for example for application in heat exchangers or catalytic converters. By post-sintering or suitable post-densification it becomes possible to produce miniature and micro-components for the most diverse precision mechanical applications. Also, the use in machine tool construction is possible.

The invention claimed is:

1. A process for layer-by-layer production of a three dimensional body, including repeating the sequence of steps:
   applying a layer of powder particles, by means of a dispensing device, upon a substrate;
   subjecting the powder particles to ionized particles (7) produced by an ionizing device (6) during falling of the powder particles onto the substrate;
   brushing the applied layer flat by a flattening device (8);
   activating, in defined areas of said layer, an adhesive present on the powder particles and/or in the powder particle layer;
   solidifying the activated adhesive to adhere powder particles to each other within the layer and to the substrate; and
   providing at least one further ionizing device (6') associated with the flattening device (8), the further ionizing device (6') exposing the applied powder particles to further charged particles (7').

2. The process according to claim 1, further comprising subjecting the powder particles, during or immediately after leaving the dispensing device, to the ionized particles and/or allowing said powder particles to freefall through a charged cloud of the ionized particles (space charge, electric field).

3. The process according to claim 1, wherein the charge differential on the powder particles is reduced by the ionized particles.

4. The process according to claim 1, wherein the deposited layer, prior to flattening, is essentially free of powder particle agglomerates.

5. The process according to claim 1, wherein at least one of the powder layers following flattening has a thickness of less than 100 μm.

6. The process according to claim 1, wherein the powder particles are coated with an activatable adhesive material.

7. The process according to claim 6, wherein the adhesive material is comprised of polymers, which are soluble in an organic solvent based binder liquid.

8. The process according to claim 7, wherein the adhesive material is activated in defined areas by a binder liquid.

9. The process according to claim 8, wherein the binder liquid is resolidified at least in part upon exposure to thermal radiation.

10. The process according to claim 9, wherein the amount of the binder liquid applied is sufficient only for moistening or wetting to a depth of maximally 20 average powder particle diameters of the powder particles.

11. The process according to claim 6, wherein the adhesive is comprised of polymers which sinter or fuse upon irradiation with laser light.

12. The process according to claim 11, wherein the adhesive is fused or sintered in defined areas by laser radiation.

13. A device for carrying out the process according to claim 1, comprising:
   a conveyor device (3) for applying powder particles (5) to a substrate;
   an ionizing device (6) for subjecting the powder particles (5) to charged particles (7) during falling of the powder particles onto the substrate;
   a flattening device (8) for brushing flat an exposed powder particle layer on said substrate;
   a binder or solvent emitting nozzle or a laser light source for activation of an adhesive present on the powder particles and/or in the powder particle layer; and
   at least one further ionizing device (6') associated with said flattening device (8), the further ionizing device (6') exposing the applied powder particles to further charged particles (7').

14. The device according to claim 13, wherein the ionizing device (6) subjects the powder particles (5) to the charged particles (7) as they leave or directly after they leave the conveyor device (3).

15. A The device according to claim 14, wherein the ionizing device (6) and the further ionizing device (6') are adapted to dissipate electrical charge of the powder particles.

16. The device according to claim 13, wherein the flattening device (8) is an electrically insulated blade (8), which brushes flat the powder particle layer applied upon the substrate.

17. The device according to claim 13, wherein at least one further ionizing device (6') produces a cloud of ionized air (charged space), which is pushed ahead of the blade during the step of brushing flat.

18. The device according to claim 13, wherein a radiation device (11) is provided for thermal radiation for drying the powder particle layer.

19. A three dimensional body of adhered powder particle layers produced by the process according to claim 1,
wherein the majority of the powder particle layers adhered to each other to form the body exhibit a thickness of less than 100 μm.

20. The three dimensional body according to claim 19, wherein the thickness of the powder particle layers is substantially the average diameter of the individual powder particles.

* * * * *